United States Patent [19]
Sekino

[11] 3,958,171
[45] May 18, 1976

[54] INVERTER CONTROLLING DEVICE
[75] Inventor: Yoshihiro Sekino, Hoya, Japan
[73] Assignee: Nippon Telegraph and Telephone Public Corporation, Tokyo, Japan
[22] Filed: Mar. 10, 1975
[21] Appl. No.: 556,801

[30] Foreign Application Priority Data
Mar. 11, 1974  Japan.............................. 49-27237
Feb. 3, 1975   Japan.............................. 50-13328

[52] U.S. Cl............................................... 321/9 A
[51] Int. Cl.²......................................... H02M 1/12
[58] Field of Search............... 321/9 R, 9 A, 18, 46, 321/47; 307/252 M

[56] References Cited
UNITED STATES PATENTS

| | | | |
|---|---|---|---|
| 3,523,236 | 4/1970 | Howell et al. | 321/9 R |
| 3,605,005 | 9/1971 | Stolzy | 321/9 A |
| 3,614,590 | 10/1971 | Kernick | 321/9 A |
| 3,649,902 | 3/1972 | Dunbar | 321/9 A |
| 3,916,285 | 10/1975 | Iwata | 321/9 A |

OTHER PUBLICATIONS
S13210035 Proceedings of the 4 Intersociety Energy Conversion Engnr. Confr., Sept. 1969, pp. 854–860.
Electronic Design "Which DC/AC Inverter?" by G. A. O'Sullivan, Dec. 6, 1974, pp. 54–59,
Principles of Inverter Ckts., Dec. 1964, by Bedford & Holt, pp. 310–313,

*Primary Examiner*—Gerald Goldberg
*Attorney, Agent, or Firm*—Wolfe, Hubbard, Leydig, Voit & Osann

[57] ABSTRACT

An inverter controlling device for eliminating higher harmonic components of lower ordinals from output voltage of the inverter is provided. The inverter is controlled such that each half cycle of a basic wave is divided into an even number of sections respectively having an equal phase interval, a pulse voltage is produced at the center of each of said sections so that the pulse width of the respective pulses in each said half cycle will be wider as they approach the center of the half cycle than that of the pulses at both ends with a predetermined ratio, and a plurality of pulse voltages similar to a pulse train of said pulse voltages is produced as an inverter output.

11 Claims, 15 Drawing Figures

INVERTER CONTROLLING DEVICE

This invention relates to a controlling system for semiconductor switching elements employed in bridge inverters for converting a direct current electric power to an alternating current electric power and, more particularly, to a device for performing such control.

As a device for converting a direct current electric power to an alternating current electric power, there is generally used inverters in which such semiconductor switching element as transistor or thyristor is employed. FIG. 1A shows schematically an example of circuitry arrangements of such inverters, in which $\overline{X}$, X, $\overline{Y}$ and Y are respectively switches modeling semiconductor switching elements. FIG. 1B is to explain the operation of this circuit. When there are provided signals X', $\overline{X}'$, Y' and $\overline{Y}'$, the switches X, $\overline{X}$, Y and $\overline{Y}$ respectively corresponding to them will be in "ON" state but, when the signals are zero, the switches will be in "OFF" state. The signals X' and $\overline{X}'$, or Y' and $\overline{Y}'$, are mutually in a relation of compensating each other and do not simultaneously exist. While the signals Y' and $\overline{X}'$, or $\overline{Y}'$ and X', exist simultaneously, a direct current source voltage $E_0$ will be impressed on a load Z. Between the period for which the signals Y' and $\overline{X}'$ exist and the period for which the signals $\overline{Y}'$ and X' exist, the polarity of the voltage impressed on the load Z will be different. That is to say, an alternating current voltage will be impressed on the load Z. A wave form denoted by "e" in FIG. 1B is the voltage impressed on the load Z. If the period $\theta$ for which the signals Y' and $\overline{X}'$, or $\overline{Y}'$ and X', exist simultaneously is varied, the effective value of the alternating current voltage "e" will be able to be adjusted.

The defect of this conventional method is, however, that a large amount of higher harmonic components of such lower ordinals as third, fifth and seventh harmonics is contained in the alternating current voltage "e" so that an alternating current filter on a large scale is required in order to produce sinusoidal waves from this alternating current voltage "e". This not only increases the size and weight of the device but also brings about such electrically defective results as a deterioration of transient characteristics of the voltage, a reduction of its efficiency, and the like.

In order to remove the above described effect, there has been suggested a method wherein the inverter is controlled so as not to generate higher harmonics of lower ordinals and higher harmonics of higher ordinals are removed with a filter. As one of such controlling methods, there has been suggested a pulse width modulating system wherein the inverter is controlled with signal waves obtained by modulating carrier waves consisting of triangular waves with sine waves as shown in FIG. 2 so as to obtain such inverter output voltage "e" as shown in FIG. 3. According to this system, a direct current component is likely to be contained in the output voltage "e" so as to saturate associated transformers or motors with the load and it is difficult to vary the voltage level and frequency of the output voltage.

As another controlling system, there has been suggested a U.S. Pat. No. 3,649,902, wherein pulses within a half cycle are arranged at the left ends of sections equally dividing the half cycle, each pulse width is so selected that the area of the pulse will be equal to the area of the section of any desired sine wave and, in order to eliminate higher harmonics in the output voltage, a "weight" is given to the width of each pulse. According to this system, there are defects that, in order to adjust the output voltage, the pulse width is varied but the "weight" is not varied and, therefore, when the output voltage is varied to a large extent, the elimination of higher harmonics will be insufficient and that the control circuit is complicated.

Further, as another system, there is suggested a Japanese Pat. No. 28406/1969, wherein an output voltage is controlled and higher harmonics are inhibited by generating step pulses equally dividing a half cycle and controlling the number and arranged positions of the step pulses. Therefore, there is a defect that the voltage can not be continuously controlled. The present invention is suggested to remove these defects.

According to the present invention, equally divided sections are set within a half cycle, pulses are arranged in the middles of the respective divided sections so as to be symmetrical to the center of the half cycle, the ratio of the respective pulse widths is so selected as to be equal to the ratio of amplitudes at the middles of the respective pulses in the sine waves of any desired output voltage, switching elements constructing an inverter are controlled by such pulse trains as above so as to eliminate higher harmonic components of lower ordinals contained in the output voltage of the inverter and, further, to enable it possible to easily adjust the frequency or voltage of a basic wave output and to control the output voltage independently of the frequency, so that such problems as described in the above will be successfully solved.

A main object of the present invention is to provide an inverter controlling device that enables to obtain an output voltage from which higher harmonic components of lower ordinals are removed.

Another object of the presnet invention is to provide an inverter controlling device of which circuit is simple.

A further object of the present invention is to provide an inverter controlling device wherein the output voltage and frequency of basic waves can be controlled and the output voltage can be controlled independently of the frequency.

Another object of the present invention is to provide an inverter controlling device wherein the output voltage can be continuously controlled and, even if the voltage is controlled widely, higher harmonics of lower ordinals can be eliminated.

Other objects and advantages of the present invention shall be made clear upon reading the following descriptions of the invention detailed with reference to certain preferred embodiments shown in attached drawings, in which.

Figure 1A:
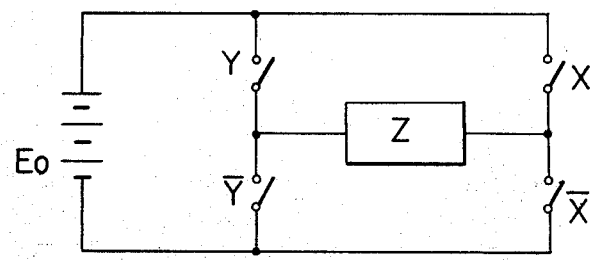
FIG. 1A is a schematic circuit diagram showing a conventional inverter device.
Figure 3:
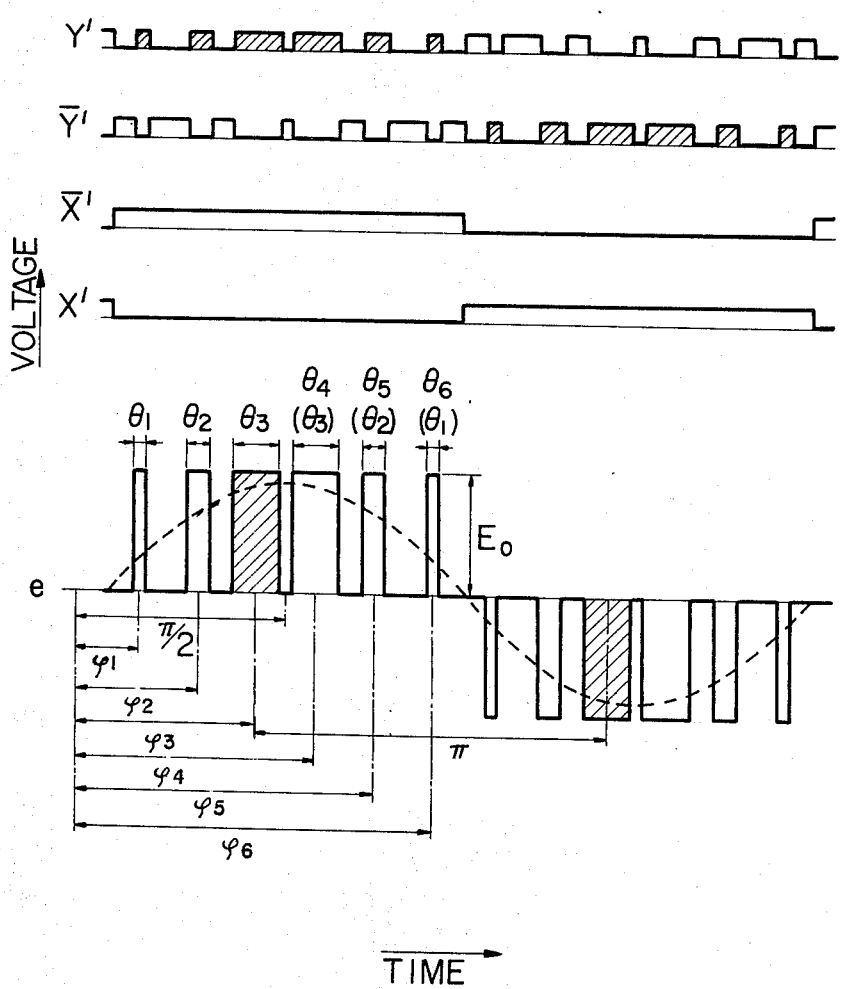
FIGS. 3 and 4 are diagrams for explaining the operation and the effect respectively of the present invention.

Referring first to FIG. 3 showing wave-form diagrams for explaining the present invention, the signals $X'$, $\overline{X}'$, $Y'$ and $\overline{Y}'$ show respectively periods for which the semiconductor switching elements $X$, $\overline{X}$, $Y$ and $\overline{Y}$ of the bridge inverter as in FIG. 1A are in "ON" and "OFF" states. "e" is a voltage wave form imposed on the load Z included in the circuit of FIG. 1A, that is, an alternating current output voltage of the bridge inverter. The output voltage "e" will be obtained when the signals $Y'$ and $\overline{X}'$, and the signals $\overline{Y}'$ and $X'$ respectively simultaneously exist and is different in the polarity of pulses between them. The widths of the respective pulses within the half cycle of the output voltage "e" are similar to the widths of the pulses shown as hatched in the signals $Y'$ and $\overline{Y}'$. Therefore, when the widths of the respective pulses shown as hatched in these signals are varied, the widths ($\theta_1$, $\theta_2$ and $\theta_3$) of the respective pulses in the output voltage "e" will also vary so that the effective value of "e" will be adjusted. Further, if the ratio of the pulse widths if selected to be as follows, higher harmonic components of lower ordinals will be eliminated.

When the square wave alternating current voltage "e" is developed into a Fourier series and is expressed as a sum of the higher harmonic voltage components, $$e = \sum_{m=1}^{\infty} \frac{4E_o}{(2m-1)\pi}\sin\frac{2m-1}{2}\theta \cdot \cos(2m-1)(wt-\Phi)$$

wherein $E_o$ is an amplitude of a pulse, $(2m-1)$ is an ordinal number ($m = 1, 2, 3 ...$) of higher harmonics, $\omega$ is an angular frequency of a basic wave $\{(2m-1) = 1\}$ alternating current voltage, $t$ is a time, $\theta$ is a width of a pulse and $\phi$ is a phase difference from a reference point.

From this formula, an "i"th square wave alternating current voltage $e_i$ of the alternating current voltage "e" in FIG. 3 can be expressed as follows:

$$e_i = \sum_{m=1}^{\infty} \frac{4E_o}{(2m-1)\pi}\sin\frac{2m-1}{2}\theta_i \cdot \cos(2m-1)(wt-\Phi_i)$$

The resultant voltage "e" of the six square wave alternating current voltages can be expressed as follows by using this formula:

$$e = \sum_{i=1}^{6} e_i$$

Generally, in case the number of square waves is $n'$, the resultant voltage will be as follows:

$$e = \sum_{i=1}^{n'}\sum_{m=1}^{\infty} \frac{4E_o}{(2m-1)\pi}\sin\frac{2m-1}{2}\theta_i \cdot \cos(2m-1)(wt-\Phi_i)$$

$$= \sum_{i=1}^{n'}\sum_{m=1}^{\infty} \frac{4E_o}{(2m-1)\pi}\sin\frac{2m-1}{2}\theta_i \{\cos(2m-1)\Phi_i \cdot \cos(2m-1)wt + \sin(2m-1)\Phi_i \cdot \sin(2m-1)wt\}$$

Here, if the respective pulses forming the resultant voltage "e" are arranged so as to be symmetrical to the center $\pi/2$ of the half cycle of the basic wave voltage as in FIG. 3, the first term within the parentheses in the above formula will become zero. Further as the second term is $\sin(2m-1)\phi_1 = \sin(2m-1)\phi n'$, $\sin(2m-1)\phi_2 = \sin(2m-1)\phi(n'-1)$ . . . $\sin(2m-1)\phi(n'/2) = \sin(2m-1_n)\phi(n'/2 + 1)$, if the number of pulses within the half cycle is selected to be an even number ($n' = 2n$), the above formula will become as follows:

$$e = \sum_{i=1}^{n}\sum_{m=1}^{\infty} \frac{8E_o}{(2m-1)\pi}\sin\frac{2m-1}{2}\theta_i \cdot \sin(2m-1)\Phi_i \cdot \sin(2m-1)wt$$

Further, if the phase distance $\phi(i+1) - \phi i$ between the respective pulses is made equal, that is, selected to be $\pi/2n$, and $$\Phi_i = \frac{(2i-1)}{4n}\pi$$

is inserted, $$e = \sum_{i=1}^{n}\sum_{m=1}^{\infty} \frac{8E_o}{(2m-1)\pi}\sin\frac{2m-1}{2}\theta_i \cdot \sin(2m-1)\frac{(2i-1)}{4n}\pi \cdot \sin(2m-1)wt \quad (1)$$

Higher harmonic components of even ordinals are not contained in this resultant voltage "e".

From the formula (1), the amplitude $E(2m-1)$ of the "$(2m-1)$th" harmonic component can be expressed as follows:

$$E(2m-1) = \sum_{i=1}^{n} \frac{8E_o}{(2m-1)\pi}\sin\frac{2m-1}{2}\theta_i \cdot \sin(2m-1)\frac{(2i-1)}{4n}\pi \quad (2)$$

If the following approximation is made here, $$\sin \frac{2m-1}{2}\theta_i \doteqdot \frac{2m-1}{2}\theta_i \quad (3)$$

the formula (2) will become as follows:

$$E(2m-1) = \sum_{i=1}^{n} \frac{4E_o\theta_i}{\pi} \sin (2m-1) \frac{(2i-1)}{4n}\pi \quad (4)$$

Here, from the periodicity of trigonometric functions, $$E\left\{4np \pm (2n-1)\right\} = \sum_{i=1}^{n} \frac{4E_o\theta_i}{\pi}\sin\left\{4np \pm (2m-1)\right\} \frac{(2i-1)}{4n}\pi$$

$$= \sum_{i=1}^{n} \frac{4E_o\theta_i}{\pi} \left\{\sin p (2i-1)\pi \cdot \cos (2m-1) \frac{(2i-1)}{4n}\pi \right.$$

$$\left. \pm \sin (2m-1) \frac{(2i-1)}{4n}\pi \cdot \cos p (2i-1)\pi \right\}$$

$$= \pm \sum_{i=1}^{n} \frac{4E_o\theta_i}{\pi}\sin (2m-1)\frac{(2i-1)}{4n}\pi = \pm E(2m-1) \quad (5)$$

wherein $P = 1, 2, 3, \ldots$.

Here, the condition for that a specific higher harmonic voltage component $E(2m'-1)$ is not contained in the resultant voltage "e" is to satisfy the following:

$$E(2m'-1) = \sum_{i=1}^{n} \frac{4E_o\theta_i}{\pi} \sin (2m'-1) \frac{(2i-1)}{4n}\pi = 0$$

For example, in the case that six pulses are contained in a half cycle as in FIG. 3, if the third and fifth harmonic components are made zero, $$\left. \begin{array}{l} E(3) = \sum_{i=1}^{n} \frac{4E_o\theta_i}{\pi}\sin \frac{3(2i-1)}{12}\pi=0 \\ \\ E(5) = \sum_{i=1}^{n} \frac{4E_o\theta_i}{\pi}\sin \frac{5(2i-1)}{12}\pi=0 \end{array} \right\}$$

If the simultaneous equation (6) is solved, $$\theta_1/\theta_3 = \sin \frac{\pi}{12}/\sin \frac{5\pi}{12}$$

$$\theta_2/\theta_3 = \sin \frac{3\pi}{12}/\sin \frac{5\pi}{12}$$

That is, $$\theta_1:\theta_2:\theta_3 = \sin \pi/12 : \sin 3\pi/12 : \sin 5\pi/12$$
$$= 0.268 : 0.732 : 1 \quad (7)$$

From the relation of the formula (5), $$E(3) = E(9) = E(15) =$$
$$E(5) = E(7) = E(17) =$$

When the relation of the formula (7) is satisfied, such higher harmonic components as the third, fifth, seventh and the like higher harmonics will be eliminated so much as to be negligible. When the ordinal $(2m-1)$ of the higher harmonics is large, the formula (3) will not be satisfied and the higher harmonics will not be able to be erased.

Generally, when the number of pulses within a half cycle of a basic wave alternating current voltage is made $2n$, the pulses are arranged so that the phase distance between the centers will be equal $(\pi/2n)$, the respective pulses have such pulse widths as are symmetrical to the center $(\pi/2)$ of the half cycle of the basic wave alternating current and the relation of the pulse widths is so selected that $$\theta_1 : \theta_2 : \ldots \theta_i : \ldots \theta_n$$

$$= \sin \frac{\pi}{4n} : \sin \frac{3\pi}{4n} : \ldots \sin \frac{(2i-1)\pi}{4n} ; \ldots \sin \frac{(2n-1)\pi}{4n} \quad (8)$$

higher harmonic components of lower ordinals will be able to be neglected.

Figure 4:
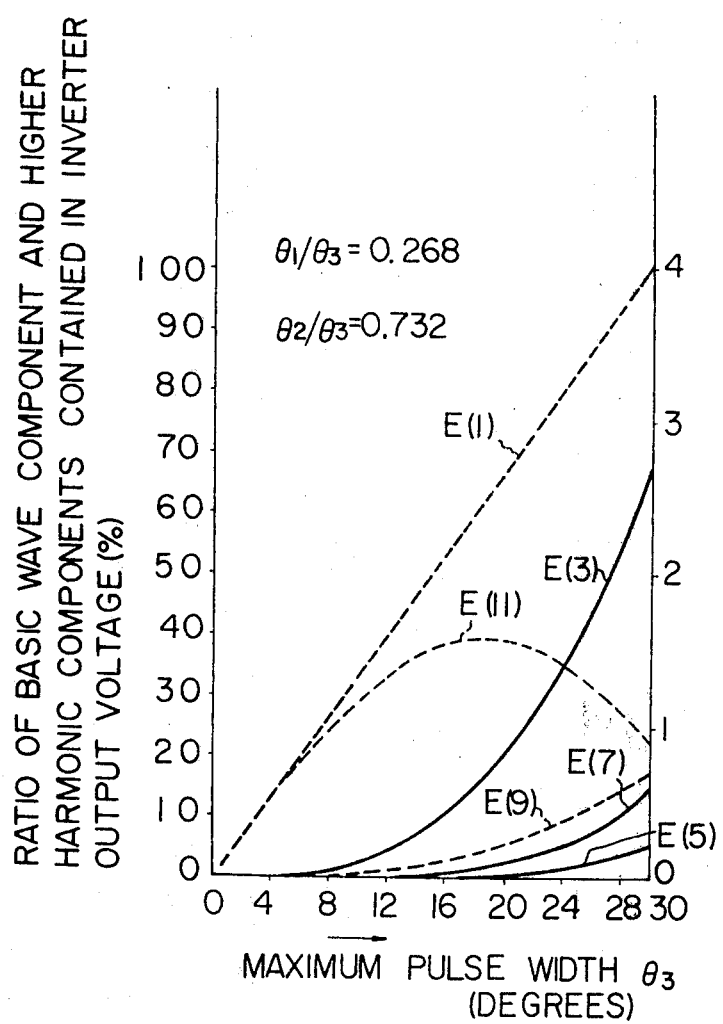

FIG. 4 shows examples of the numerical values of the above. Each higher harmonic component $E(2m-1)$ is normalized with a value when $\theta_3 = 30°$ ($=\pi/6$) of the basic wave component. The abscissa shows the width $\theta_3$ of the maximum pulse and the ordinate shows the ratio of the basic wave component and the higher harmonic components contained in an inverter output voltage. The curve $E(1)$ shown in dotted line is of the basic wave component, of which ratio is shown on the scale of left-hand ordinate. The curves $E(3)$, $E(5) \ldots$ shown in solid line are respectively of the third, fifth and the like higher harmonics of odd ordinals, of which ratio is shown on the scale of right-hand ordinate. It is found from the diagram that the third, fifth and the like higher harmonic components are smaller. Higher harmonic components of ordinals higher than the ninth and eleventh are to be removed by using a filter as usual.

Figure 5:
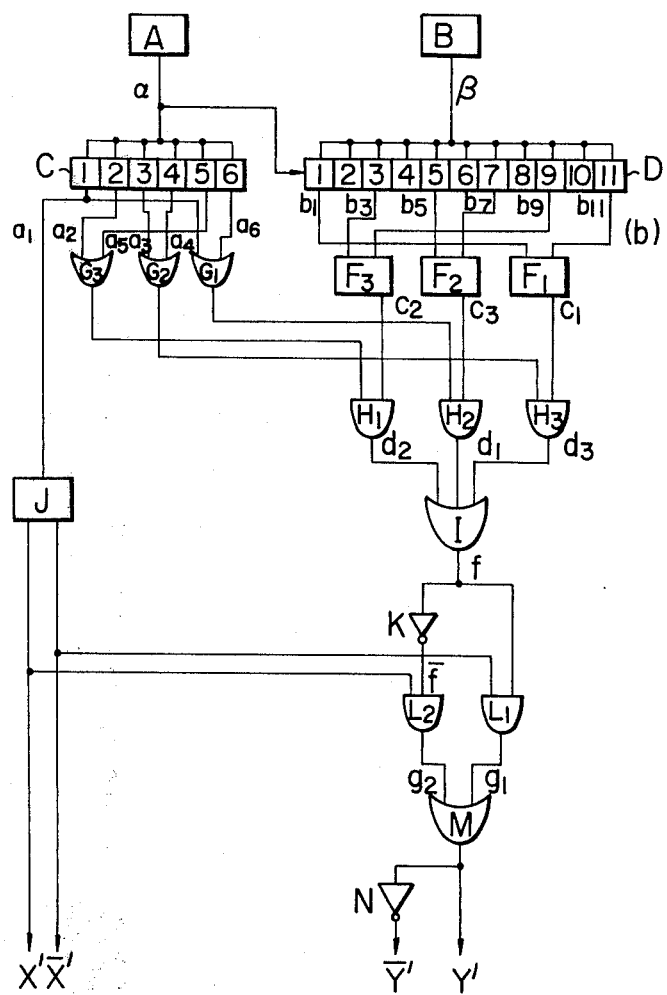
FIG. 5 is a block diagram of an embodiment of the present invention.

FIG. 5 is a block diagram of an embodiment according to the present invention for obtaining such signals Y', $\overline{Y}'$, X' and $\overline{X}'$ as in FIG. 3. The reference A denotes a basic reference pulse generator, which generates pulses α of a frequency integer times (12 times in this embodiment) as high as the operating frequency of the inverter (when the operating frequency of the inverter is to be made variable, the frequency of the pulses α should be varied). The reference B denotes a variable frequency pulse generator which generates pulses β. The reference C is a ring counter for dividing the frequency of the pulses α, which is of six steps in the present embodiment, and periodically generates divided signals $a_1$ to $a_6$. The reference D is a counting circuit (a shift register is used in this embodiment but such other circuit as an up-down counter can be also used), which provides signals delaying in the cycle with respect to the pulses α of the input by integer times as long as the cycle of the pulses β. In this embodiment, signals delaying in the cycle respectively by 0, 2, 4, 6, 8 and 10 times as long as the cycle of the pulses β. $G_1$, $G_2$ and $G_3$ are "OR" circuits, of which $G_1$ receives the outputs $a_1$ and $a_6$ of the ring counter C as inputs, $G_2$ receives the outputs $a_3$ and $a_4$ of the ring counter C as inputs and $G_3$ receives the outputs $a_2$ and $a_5$ of the ring counter C as inputs. $F_1$, $F_2$ and $F_3$ are flip-flops, of which $F_1$ receives the outputs $b_1$ and $b_{11}$ of the counting circuit D as inputs, $F_2$ receives the outputs $b_5$ and $b_7$ of the counting circuit D as inputs, and $F_3$ receives the outputs $b_3$ and $b_9$ of the counting circuit D as inputs. $H_1$, $H_2$ and $H_3$ are "AND" circuits, of which $H_1$ receives the output $C_2$ of the flip-flop $F_3$ and the output of the "OR" circuit $G_3$ as inputs, $H_2$ receives the output $C_3$ of the flip-flop $F_2$ and the output of the "OR" circuit $G_1$ as inputs and $H_3$ receives the output $C_1$ of the flip-flop $F_1$ and the output of the "OR" circuit $G_2$ as inputs. I is an "OR" circuit to which the outputs $d_2$, $d_1$ and $d_3$ of the "AND" circuit $H_1$, $H_2$ and $H_3$ are supplied as inputs. J is a flip-flop, which receives the output $a_1$ of the ring counter C as an input and provides the outputs X' and $\overline{X}'$. $L_1$ and $L_2$ are "AND" circuits, of which $L_1$ receives the output f of the "OR" circuit I and the output $\overline{X}'$ of the flip-flop J as inputs, $L_2$ receives an output $\overline{f}$ of a "NOT" circuit K obtained by inverting therein the output f of the "OR" circuit I and the output X' of the flip-flop J as inputs. M is an "OR" circuit which receives the outputs $g_1$ and $g_2$ of the "AND" circuits $L_1$ and $L_2$ as inputs and provides an output Y' and further an output $\overline{Y}'$ through a "NOT" circuit N in which the output Y' is inverted.

These output signals X', $\overline{X}'$, Y' and $\overline{Y}'$ are respectively amplified in the electric power with generally used amplifiers and, as required, provided respectively to the switches X, $\overline{X}$, Y and $\overline{Y}$ of the inverter as insulated signals.

Figure 6:
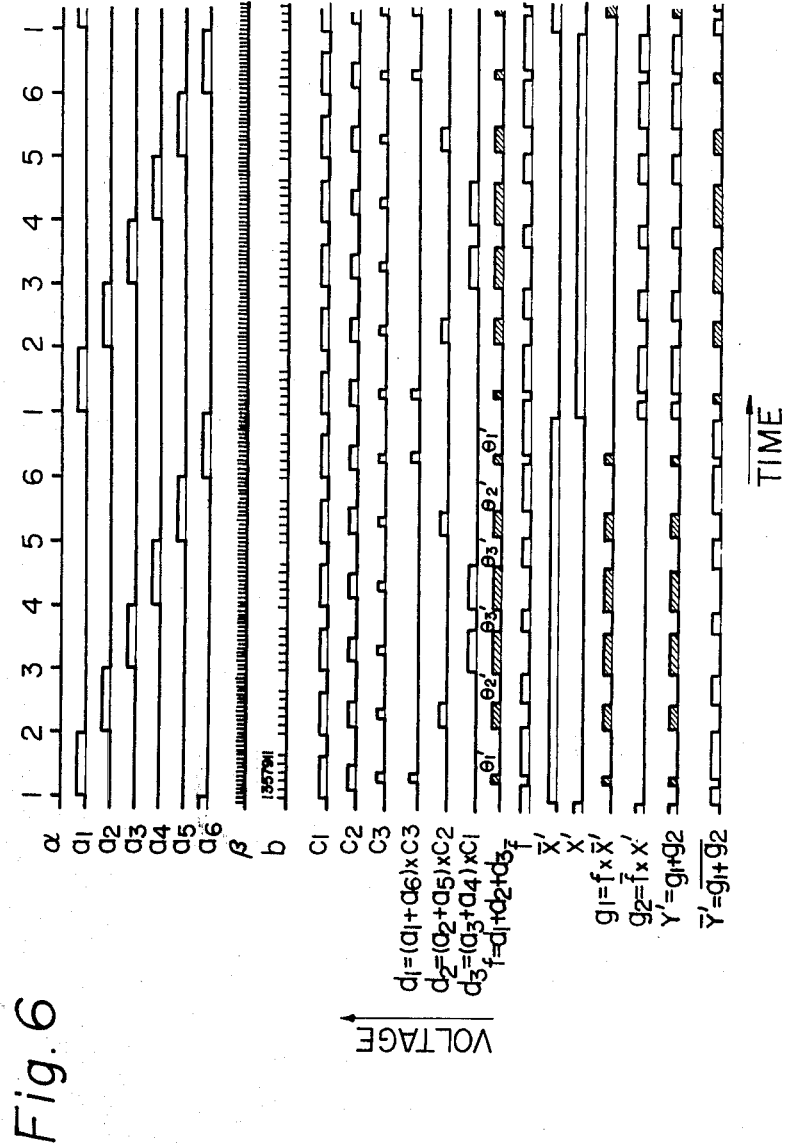
FIGS. 6 and 7 are wave-form diagrams for explaining the operation of the device shown in FIG. 5.

FIG. 6 shows the respective signal wave-forms at the respective parts of the circuit shown in FIG. 5 and the operation of the circuit in FIG. 5 shall be explained in the following referring to FIG. 6. When the ring counter C is triggered with the output α of the reference pulse generator A, the signals $a_1$ to $a_6$ divided into one sixth in turn will be obtained. When the flip-flop J is triggered with the signal $a_1$, the signals X' and $\overline{X}'$ will be obtained. If the output α of the high frequency pulse generator B is being applied to the counting circuit D as clock pulses, whenever the signal α comes in, it will be delayed by a time integer times as long as the cycle τ of β and a signal $b_j$ (wherein j = 1, 2, ..., 11) will come out. In such case, signals delayed respectively by 0, 2τ, 4τ, 6τ, 8τ and 10τ will be obtained. When the signals of the delay times of 0 and 10τ are applied to the flip-flop $F_1$ as set and reset seignals, a signal $c_1$ having a pulse width of 10τ will be obtained. In the same manner, when signals delayed by 2τ and 8τ are applied to the flip-flop $F_3$, a signal $c_2$ will be obtained and, when signals delayed by 4τ and 6τ are applied to the flip-flop $F_2$, a signal $c_3$ will be obtained. The signals $c_1$, $c_2$ and $c_3$ in which the center points of the pulses coincide with one another will be obtained whenever the signal α is applied to the counting circuit D. Next, when the signals $a_1$ and $a_6$ are put into the "OR" circuit $G_1$ and its output and the signal $c_3$ are put into the "AND" circuit $H_2$, a signal $d_1$ will be obtained. In the same manner, when the "OR" of the signals $a_2$ and $a_5$ is taken and further the "AND" of them and the signal $c_2$ is taken, a signal $d_2$ will be obtained and, when the "OR" of the signals $a_3$ and $a_4$ is taken and further the "AND" of them and the signal $c_1$ is taken, a signal $d_3$ will be obtained. When these signals $d_1$, $d_2$ and $d_3$ are put into the "OR" circuit I, a signal f will be obtained. This signal f comprises the signals $c_1$, $c_2$ and $c_3$ which are periodically arranged in the order of $c_1$, $c_2$, $c_3$, $c_3$ $c_2$ and $c_1$. When the signal f is put into the "NOT" circuit K, a signal $\overline{f}$ will be obtained. When the signals f and X' are put into the "AND" circuit $L_1$, a signal $g_1$ will be obtained. When the signals $\overline{f}$ and $\overline{X}'$ are put into the "AND" circuit $L_2$, a signal $g_2$ will be obtained. When the signals $g_1$ and $g_2$ are put into the "OR" circuit M, a signal Y' will be obtained. When the signal Y' is put into the "NOT" circuit N, a signal $\overline{Y}'$ will be obtained. The thus obtained signals X', $\overline{X}'$, Y' and $\overline{Y}'$ are the same as the signals in FIG. 3 and are the signals which drive the respective semiconductor switching elements X, $\overline{X}$, Y and $\overline{Y}$ in the inverter of FIG. 1A.

The respective pulses $c_1$, $c_2$ and i $c_3$ will be generated whenever the pulse α arrives from the pulse generator A. The respective centers of the pulses $c_1$, $c_2$ and $c_3$ coincide with one another. Therefore, the respective intervals of the centers of pulses of pulse trains $\theta'_1$, $\theta'_2$ and $\theta'_3$ in the signal f comprising the selectively arranged pulses $c_1$, $c_2$ and $c_3$ and of pulses $\theta_1$, $\theta_2$ and $\theta_3$ contained in the alternating current output voltage "e" in FIG. 3 are equal to the distance of the pulses α. Further, the ratio $\theta_1:\theta_2:\theta_3$ of the widths of these pulses is equal to the ratio of the widths of the pulses $c_1$, $c_2$ and $c_3$, which is 0.2:0.6:1 (= 2τ:6τ:10τ) showing a fixed value. In the foregoing description of the embodiment in FIG. 3, the counting circuit D is formed to be of 11 steps so as to develop the signal $b_j$ having the maximum delay time of 10τ. If, for example, the counting circuit D is made to be of 1001 steps so as to develop the signal $b_j$ having the maximum delay time of 1000τ (in this case, the pulse period τ of the pulse generator B is made short), the pulses $c_3$, $c_2$ and $c_1$ will be made respectively of the combinations of 366τ and 634τ, of 134τ and 866τ and of 0 and 1000τ and, therefore, the widths of these pulses will be 268τ, 732τ and 1000τ in turn. Therefore, the ratio $\theta_1:\theta_2:\theta_3$ of the pulses in FIG. 3 will be 0.268:0.732:1 (268τ:732τ:1000τ) and the higher harmonic components of lower ordinals contained in the alternating current voltage "e" will be well attenuated as shown in FIG. 4.

If the pulse generating frequency of the pulse generator B is varied here, the cycle τ of the signal β will vary so that the pulse widths of the pulses $c_1$, $c_2$ and $c_3$ will vary. Thereby the pulse widths of the pulses $\theta_1$, $\theta_2$ and $\theta_3$ in FIG. 3 will vary and, therefore, the magnitude of the basic wave voltage contained in the alternating current voltage "$e$" will be able to be adjusted (the relation between the pulse of the width $\theta_3$ and the magnitude of the basic wave voltage will be as shown in FIG. 4). Further, if the pulse generating frequency of the pulse generator A is varied, the cycle of the signal $\alpha$ will vary and therefore the frequency of the alternating current voltage "$e$" and, thus, that of the basic wave voltage will be able to be adjusted.

Even if the pulse generating frequencies of these pulse generators A and B are varied, the relative phase relation and ratio of pulse widths of the pulses $c_1, c_2$ and $c_3$ and, therefore, those of the pulses $\theta_1$, $\theta_2$ and $\theta_3$ in FIG. 3 will not vary so that the effect of inhibiting the higher harmonic components of lower ordinals will not be lost. Thus, according to the present invention, a plurality of pulses having a fixed ratio of pulse widths within a half cycle of a basic wave voltage of an inverter can be generated at fixed phase intervals and the basic wave voltage and frequency can be easily adjusted.

While in the present embodiment the explanation has been made with reference the case where six pulses are contained in the half cycle of the output voltage of the inverter, it should be understood that the same operation can be easily obtained with any other number of pulses than that.

Further, in the present embodiment, a plurality of signals $b_j$ respectively different in the delay time are developed with one counting circuit D but, even if a plurality of the counting circuits D are provided for the respective signals different in the delay time, the same operation will be obtained.

Figure 7:
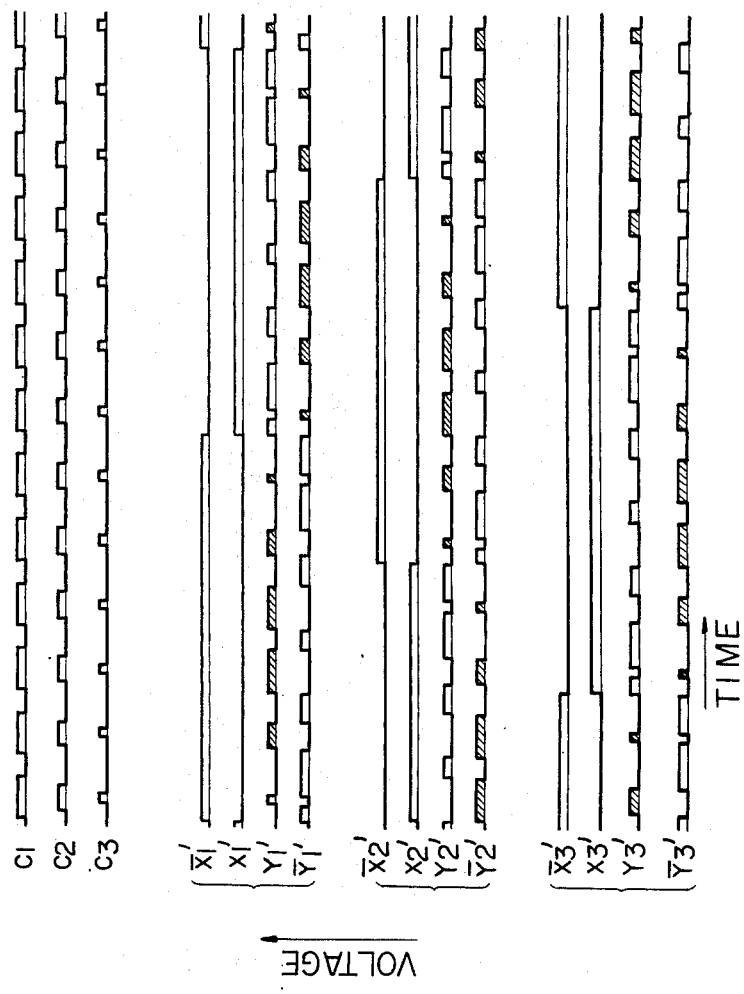

It should be further noted here that it is also possible to obtain signals which are in the arrangement of the pulses $c_1$, $c_2$ and $c_3$ as in FIG. 6 and are caused to have such fixed phase difference as in FIG. 7. That is, when three sets of signals are produced so as to have sequentially a phase difference of 120° and three sets of the inverters are driven respectively by such signals of the respective sets, a three-phase alternating current voltage will be obtained.

In the present embodiment, the pulse generators A and B are arranged to operate respectively independently. However, in this case, the time until the signal $\alpha$ enters the counting circuit D and then the signal $\beta$ comes in as a clock pulse will not be constant but will rather periodically vary, with a beat determined by the frequencies of both pulses. When the operation of the pulse generator B is reset by the signal $\alpha$ of the pulse generator A, the time difference until the signal $\alpha$ enters the counting circuit D and then the clock pulse signal $\beta$ comes in will be constant and there will exist no beat any more.

Figure 8:
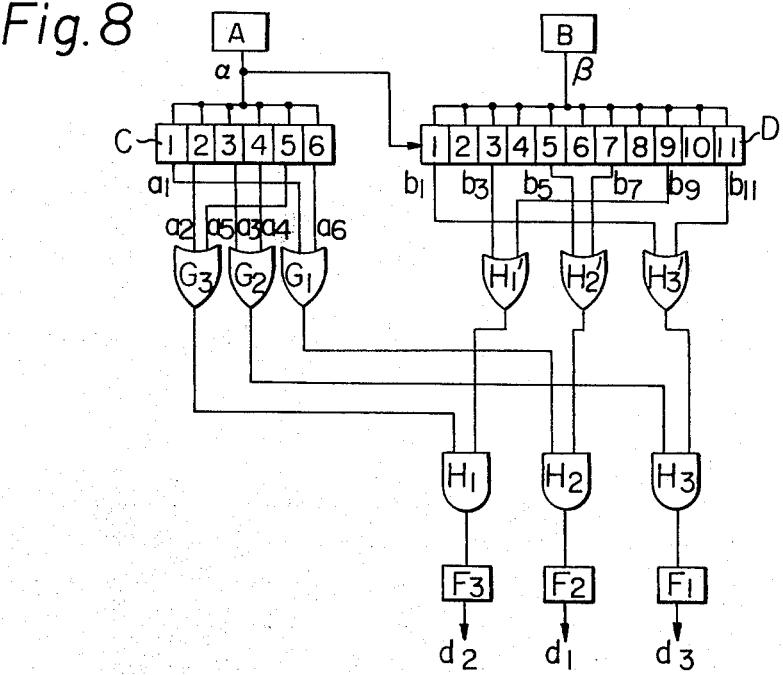
FIG. 8 is a block diagram showing another example of a part of the embodiment of FIG. 5.

Further, instead of obtaining the signals $c_1$, $c_2$ and $c_3$ and then after obtaining the signals $d_3$, $d_2$ and $d_1$ as shown in FIG. 5, it is also possible to obtain the signals $d_1$, $d_2$ and $d_3$ directly, without obtaining the signals $c_1$, $c_2$ and $c_3$, in such that, for example, the OR is taken with the signals of delay times of 0 and $10\tau$ of the counting circuit D, the AND of it and the output of the OR circuit $G_2$ is taken and the flip-flop is triggered with its output signal, as shown in FIG. 8, the signal $d_3$ will be obtained.

Figure 9:
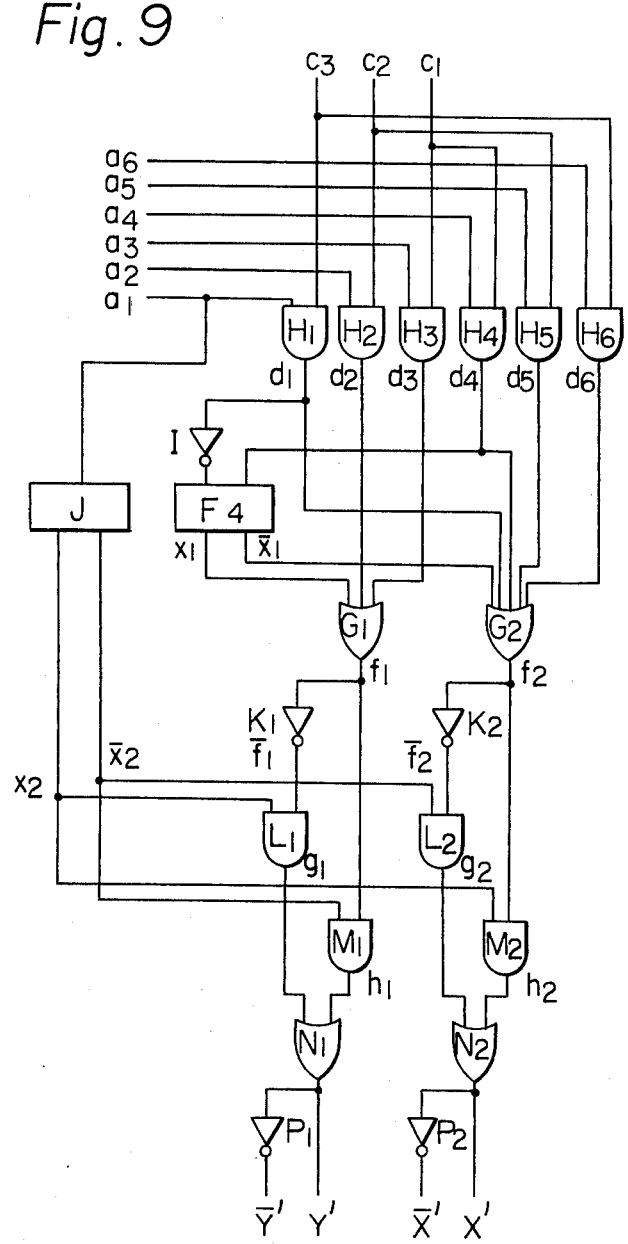
FIGS. 9 and 10 are block diagram showing another embodiment of the present invention and a wave-form diagram for explaining the operation of the same.

In FIG. 9 there is shown in a diagram another embodiment of the present invention for obtaining the signals $Y'$, $\overline{Y}'$ $X'$ and $\overline{X}'$. In the drawing, $H_1$ to $H_6$, $L_1$, $L_2$, $M_1$ and $M_2$ are respectively AND circuits, I, $K_1$, $K_2$, $P_1$ and $P_2$ are respectively NOT circuits, J and $F_4$ are flip-flops, and $G_1$, $G_2$, $N_1$ and $N_2$ are respectively OR circuits.

Figure 10:
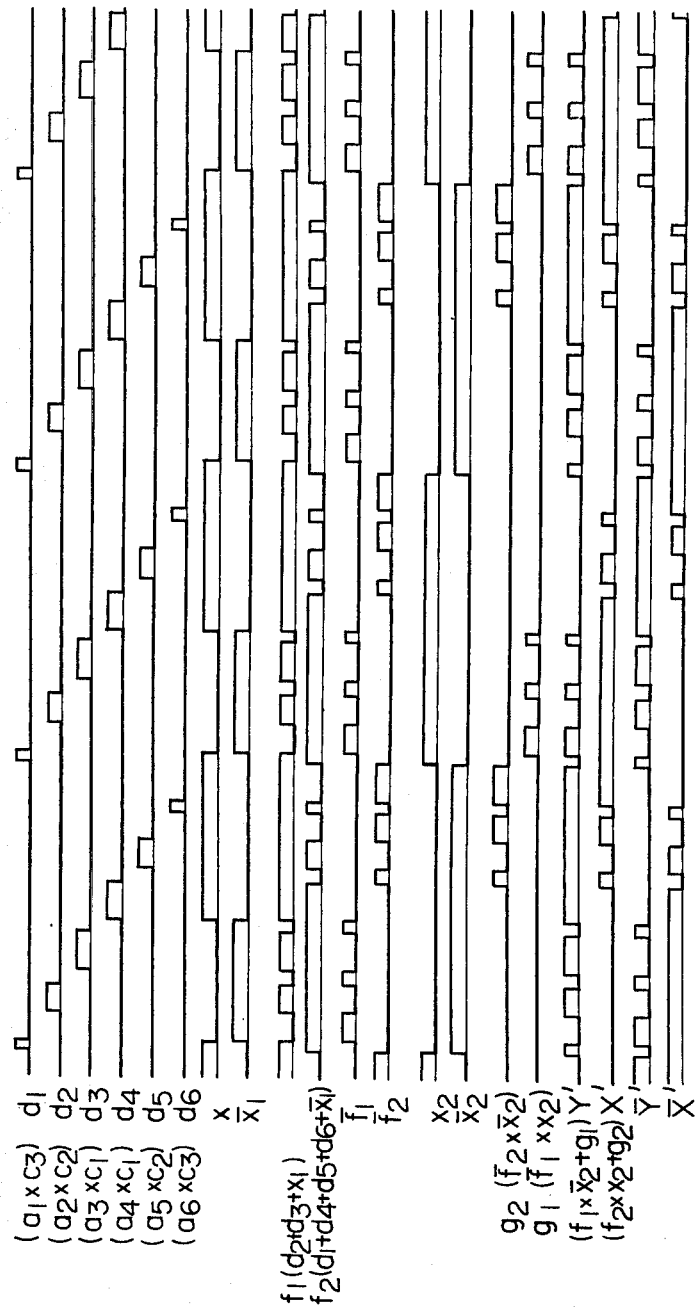

The operation of this embodiment of FIG. 9 shall be explained with reference to wave-form diagram of FIG. 10.

In this embodiment, the pulse signals $C_1$, $C_2$ and $C_3$ and $a_1$ through $a_6$ are respectively the same with the signals used in the foregoing embodiment of FIG. 5. The flip-flop J actuates upon receiving the pulse signal $a_1$ as an input and produces pulse signals $x_2$ and $\bar{x}_2$ as outputs. The AND circuit $H_1$ receives the pulse signals $c_3$ and $a_1$ as inputs and provides pulse signal $d_1$ and, in the similar manner, the other AND circuit $H_2$ through $H_6$ produce pulse signals $d_2$ through $d_6$, respectively. The flip-flop $F_4$ receives the pulse signal $d_4$ thus produces and also a NOT signal of the pulse signal $d_1$ and produces pulse signals $x_1$ and $\bar{x}_1$. The OR circuit $G_1$ receives the pulse signals $x_1$, $d_2$ and $d_3$ and produces pulse signal $f_1$, and the OR circuit $G_2$ receives the pulse signals $\bar{x}_1$, $d_1$, $d_4$, $d_5$ and $d_6$ and produces pulse signal $f_2$. The AND circuit $L_1$ receives the pulse signal $x_2$ and a NOT signal of the pulse signal $f_1$ and produces pulse signal $g_1$, and the other AND circuit $L_2$ receives the pulse signal $\bar{x}_2$ and a NOT signal of the pulse signal $f_2$ and produces pulse signal $g_2$. The further AND circuit $M_1$ receives the pulse signals $\bar{x}_2$ and $f_1$ and produces pulse signal $h_1$ and the AND circuit $M_1$ receives the pulse signals $x_2$ and $f_2$ and produces pulse signals $h_2$. The OR circuit $N_1$ receives the pulse signals $g_1$ and $h_1$ and produces pulse signal $Y'$, the other OR circuit $N_2$ receives the pulse signals $g_2$ and $h_2$ and produces pulse signal $X'$. Further, the NOT circuit $P_1$ receives the pulse signal $Y'$ and produces pulse signal $\overline{Y}'$, and the other NOT circuit $P_2$ receives the pulse signal $X'$ and produces pulse signal $\overline{X}'$.

When a certain other combination of the pulse signals $d_1$ through $d_6$ than that described above is presented to the flip-flop $F_4$ in the above embodiment, it is possible to obtain another combination of the pulse signals $Y'$, $\overline{Y}'$, $X'$ and $\overline{X}'$.

Figure 11:
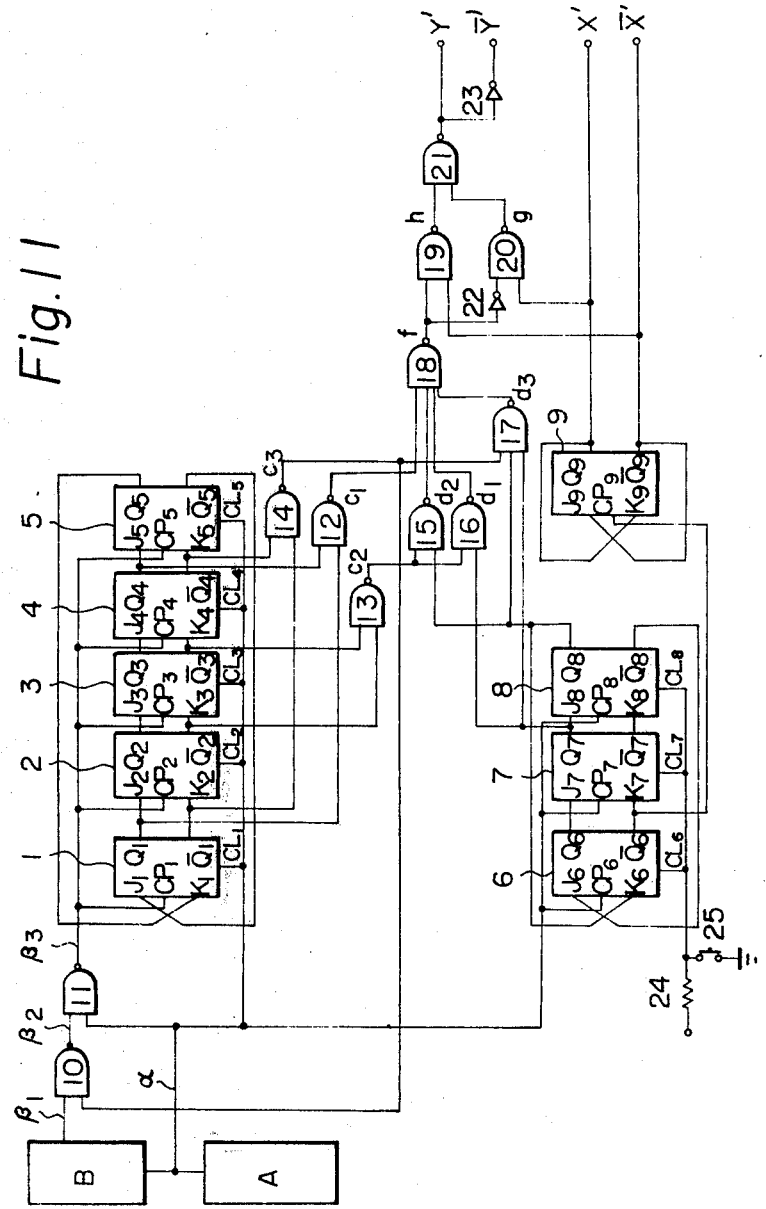
FIG. 11 shows a practical circuitry arrangement of the embodiment of FIG. 5.

FIG. 11 shows an example of practical circuitry arrangement according to the present invention, in which A is a reference pulse generator generating pulses $\alpha$ of a frequency integer times (12 times in this instance) as high as the operating frequency of the inverter (when the operating frequency of the inverter is to be made variable, the frequency of this pulse $\alpha$ should be varied), B is a pulse generator of a frequency higher than that of the pulse generator A and generating pulses $\beta_1$, 1 to 9 are respectively flip-flop circuits of IC, 10 to 21 are NAND circuits of IC, 22 and 23 are NOT circuits of IC which convert the signal of 1 level to 0 level or the signal of 0 level to 1 level, 24 is a resistance connected to the positive pole of a direct current source which supplying a power to the respective said IC circuits, and 25 is a push button switch. The respective sets of the flip-flop circuits 1 to 5 and 6 to 8 form a ring counter. The outputs of the pulse generators A and B will be on the "0" level which corresponding to zero voltage when they respectively generate pulses, but will be on the "1" level which corresponding to the level of the direct current source voltage of the IC circuit. Further, 11 is a NAND circuit, inputs to which are the output $\alpha$ of the pulse generator A and the output of the NAND circuit 10 of which input is the output $\beta_1$ of the pulse generator B, and this NAND circuit provides the output $\beta_3$ to the respective clock input terminals $CP_1$, $CP_2$, $CP_3$, $CP_4$ and $CP_5$ of the five flip-flops 1, 2, 3, 4 and 5.

The output terminals $Q_1$ and $\overline{Q}_1$ of the flip-flop 1 are connected respectively to the input terminals $J_2$ and $K_2$ of the flip-flop 2. The output terminals $Q_2$ and $\overline{Q}_2$ of the flip-flop 2 are connected respectively to the input terminals $J_3$ and $K_3$ of the flip-flop 3. The output terminals $Q_3$ and $\overline{Q}_3$ of the flip-flop 3 are connected respectively to the input terminals $J_4$ and $K_4$ of the flip-flop 4. The output terminals $Q_4$ and $\overline{Q}_4$ of the flip-flop 4 are connected respectively to the input terminals $J_5$ and $K_5$ of the flip-flop 5. The output terminals $Q_5$ and $\overline{Q}_5$ of the flip-flop 5 are connected respectively to the input terminals $K_1$ and $J_1$ of the flip-flop 1. Further the output $\alpha$ of the pulse generator A is given to the clear terminals $CL_1$ to $CL_5$ of the flip-flops 1 to 5.

6, 7 and 8 are flip-flops forming a ring counter and the output $\alpha$ of the pulse generator A is given to their clock input terminals $CP_6$, $CP_7$ and $CP_8$. The output terminals $Q_6$ and $\overline{Q}_6$ of the flip-flop 6 are connected respectively to the input terminals $J_7$ and $K_7$ of the flip-flop 7. The output terminals $Q_7$ and $\overline{Q}_7$ of the flip-flop 7 are connected respectively to the input terminals $J_8$ and $K_8$ of the flip-flop 8. The output terminals $Q_8$ and $\overline{Q}_8$ of the flip-flop 8 are connected respectively to the input terminals $K_6$ and $J_6$ of the flip-flop 6. Further, the clear terminals $CL_6$ to $CL_8$ of the flip-flops 6 to 8 are connected to a direct current source through a resistance 24. The point of connection of the clear terminals $CL_6$ to $CL_8$ with the resistance 24 is made to be able to be earthed through the push button switch 25.

The output terminals $\overline{Q}_6$ of the flip-flop 6 is connected to the clear input terminal $CP_9$ of the flip-flop 9. The outputs $Q_9$ and $\overline{Q}_9$ of the flip-flop 9 are used respectively as control signals $X'$ and $\overline{X}'$ operating the switching elements of the inverter and are connected respectively to the input terminals $J_9$ and $K_9$ of the flip-flop 9.

12 is a NAND circuit provided with the output from the output terminal $Q_1$ of the flip-flop 1 and the output from the output terminal $Q_4$ of the flip-flop 4 as inputs and its output is given to the NAND circuit 18. 13 is a NAND circuit provided with the output from the output terminal $\overline{Q}_2$ of the flip-flop 2 and the output from the output terminal $\overline{Q}_3$ of the flip-flop 3 as inputs and its output is given to the NAND circuits 15 and 16. 14 is a NAND circuit provided with the output from the output terminal $\overline{Q}_1$ of the flip-flop 1 and the output from the output terminal $\overline{Q}_4$ of the flip-flop 4 as inputs and its output is given to the NAND circuit 17. 15 is a NAND circuit provided with the output from the output terminal $Q_8$ of the flip-flop 8 and the output $C_2$ of the NAND circuit 13 as described above as inputs and its output is given to the NAND circuit 18. 16 is a NAND circuit provided with the output from the output terminal $Q_7$ of the flip-flop 7 and the output $C_2$ of the NAND circuit 13 as described above as inputs and its output is given to the NAND circuit 18. 17 is a NAND circuit provided with the output from the output terminal $Q_7$ of the flip-flop 7, the output from the output terminal $Q_8$ of the flip-flop 8 and the output $C_3$ from the NAND circuit 14 as described above as inputs. 18 is a NAND circuit receiving the outputs $c_1, d_2, d_1$ and $d_3$ of the NAND circuits 12, 15, 16 and 17 as inputs and its output is given to the NAND circuit 20 through the NAND circuit 19 and NOT circuit 22. 19 is a NAND circuit receiving the output f from the NAND circuit 18 and the output from the output terminal $\overline{Q}_9$ of the flip-flop 9 as inputs and its output is given to the NAND circuit 21. 20 is a NAND circuit which receives as inputs the output $f$ of the NAND circuit 18 through the NOT circuit 22 and also the output directly from the output terminal $Q_9$ of the flip-flop 9, and its output is given to the NAND circuit 21. One of the outputs of the NAND circuit 21 becomes the control signal $Y'$ and the other becomes the control signal $\overline{Y}'$ through the NOT circuit 23 for operating the switching elements of the inverter.

Figure 12:
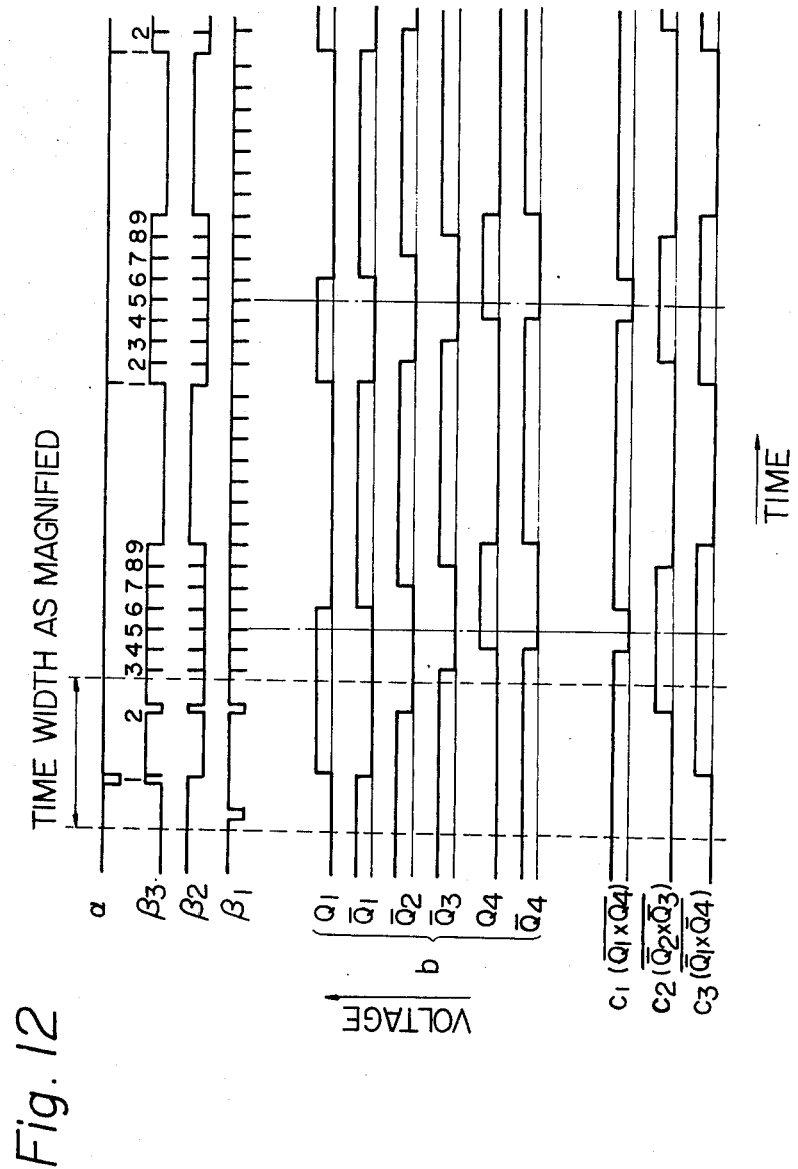
FIGS. 12 and 13 are wave-form diagrams for explaining the operation of the circuit shown in FIG. 11.
Figure 13:
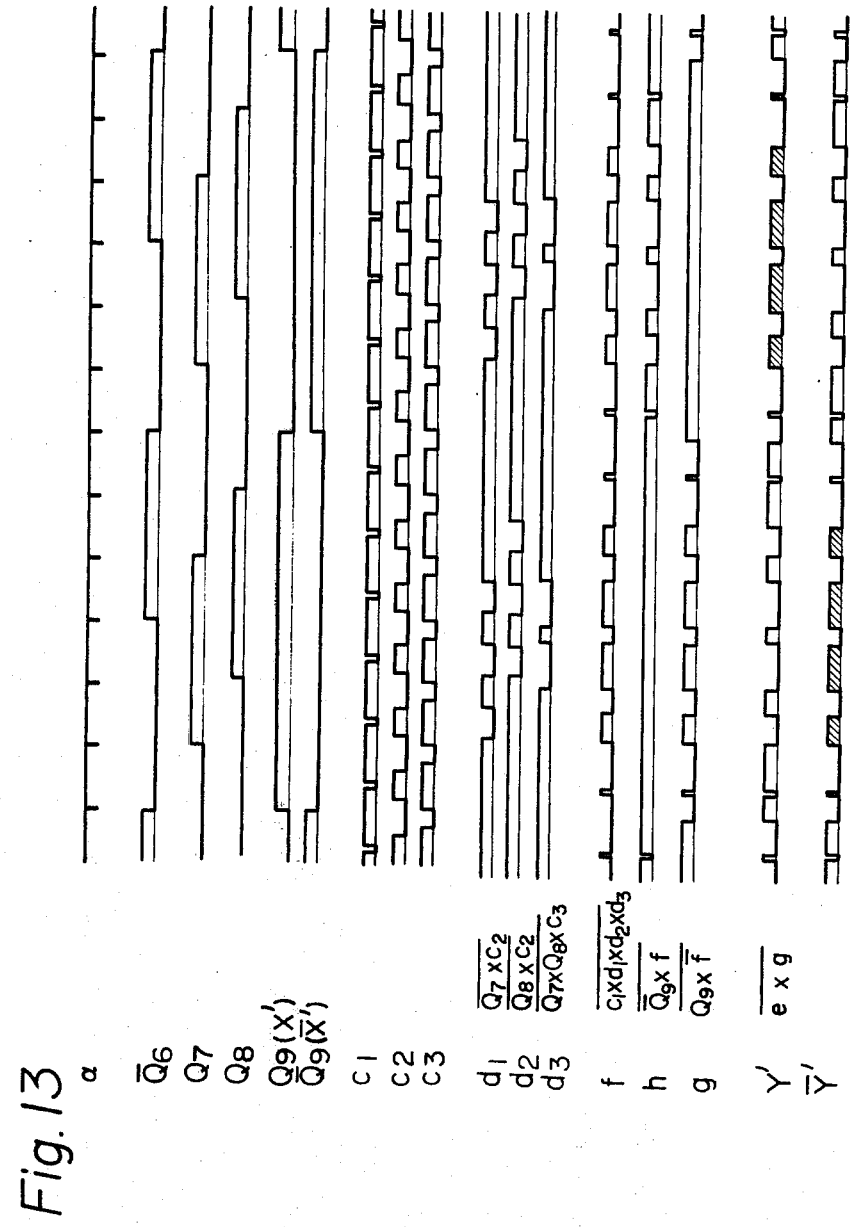

Now, the operation of the circuit in FIG. 11 shall be explained with reference to FIGS. 12 and 13. The push button 25 is pushed for starting the device so as to reset the flip-flops 6, 7 and 8. Now, if the level of the output $C_3$ of the NAND circuit 14 is "0", the output $\beta_2$ of the NAND circuit 10 will be on the "1" level, irrespective of the state of the output $\beta_1$ of the pulse generator B. Therefore, while the level of the output of the pulse generator A is "1", the output $\beta_3$ of the NAND circuit 11 will be on the "0" level and the states of the flip-flops 1 to 5 forming the ring counter will not vary. Next, when the output $\alpha$ of the pulse generator A becomes the "0" level, the respective clear terminals $CL_1$ to $CL_5$ of the flip-flops 1 to 5 will become the "0" level and will be reset. The respective outputs $Q_1$ to $Q_5$ of these flip-flops will become the "0" level and the outputs $\overline{Q}_1$ to $\overline{Q}_5$ will become the "1" level. Further, the output $\beta_3$ of the NAND circuit 11 will become the "1" level and will be applied to the respective clocks $CP_1$ to $CP_5$ of the flip-flops 1 to 5. When the output $\alpha$ of the pulse generator A becomes the "1" level again, the output $\beta_3$ of the NAND circuit 11 will become the "0" level but, when this output $\beta_3$ varies from the "1" level to the "0" level, among the respective flip-flops 1 to 5, only the flip-flop in which the inputs J and K are respectively on the "1" and "0" levels will vary to be in an operating state. That is to say, only the flip-flop 1 will operate and its outputs $Q_1$ and $\overline{Q}_1$ will be respectively the "1" and "0" levels. As the level of this $\overline{Q}_1$ becomes the "0" level, the output $C_3$ of the NAND circuit 14 will vary to the "1" level in the state. As this $C_3$ becomes the "1" level, the output $\beta_2$ of the NAND circuit 10 will become the "0" level and, therefore, the output $\beta_3$ of the NAND circuit 11 will become the "1" level. While the signal $\beta_1$ is the "0" level, the signal $\beta_2$ will be the "1" level and the signal $\beta_3$ will be the "0" level. When this signal $\beta_3$ varies to the "0" level, the flip-flop 2 in which the inputs J and K are respectively the "1" and "0" levels will operate and its outputs $Q_2$ and $\overline{Q}_2$ will become respectively the "1" and "0" levels. Then, in the same manner, the flip-flops 1 to 5 will operate in turn until the number of pulses of the signal $\beta_3$ becomes 9. When the outputs $Q_4$ and $\overline{Q}_4$ of the flip-flop 4 again become respectively the "0" and "1" levels with the ninth pulse of the signal $\beta_3$, the output $C_3$ of the NAND circuit 14 will become the "0" level, therefore the output $\beta_2$ of the NAND circuit 10 will become tthe "1" level and the output $\beta_3$ of the NAND circuit 11 will become the "0" level. In this state, even if the output pulse $\beta_1$ of the pulse generator B is generated, the flip-flops 1 to 5 will not operate. When the output pulse $\alpha$ of the pulse generator A is generated, the initial state will return and the flip-flops 1 to 5 will resume the operation.

A pulse group is now produced by utilizing the outputs $Q_1$ to $Q_4$ and $\overline{Q}_1$ to $\overline{Q}_4$ of the flip-flops 1 to 5. First of all, the outputs $Q_1$ and $Q_4$ enter the NAND circuit 12 to obtain the output $C_1$, $\overline{Q}_2$ and $\overline{Q}_3$ enter the NAND circuit 13 to obtain the output $C_2$, and $\overline{Q}_1$ and $\overline{Q}_4$ enter the NAND circuit 14 to obtain the output $C_3$.

The center of these pulse groups $C_1$, $C_2$ and $C_3$ is in the position of the fifth pulse of the pulse signal $\beta_3$. Further these pulses $C_1$, $C_2$ and $C_3$ have respectively the widths of 2, 6 and 8 pulses intervals respectively of $\beta_3$ ($C_1$ is of the period of the "0" level). Therefore, the ratio of the pulse widths of the pulses $C_1$, $C_2$ and $C_3$ is $$C_1 : C_2 : C_3 = 2 \text{ (pulse intervals)} : 6 \text{ (pulse intervals)} : 8 \text{ (pulse intervals)}$$
$$= 0.25 : 0.75 : 1.0 \quad (7)$$

and approximately satisfying the condition formula (4).

The cycle of the pulse groups $C_1$, $C_2$ and $C_3$ is equal to the cycle of the output pulse $\alpha$ of the pulse generator A. Further, the pulse width is integer times (2, 6 and 8 times respectively for the pulses $C_1$, $C_2$ and $C_3$) as large as the cycle of the output pulse $\beta_1$ of the pulse generator.

The flip-flops 6, 7 and 8 forming a ring counter will operate in turn to obtain the outputs $\overline{Q_6}$, $Q_7$ and $Q_8$ (FIG. 7) when they receive the output pulse $\alpha$ of the pulse generator A. Further, the independent flip-flop 9 will operate to obtain the outputs $Q_9$ (X') and $Q_9$ ($\overline{X}'$) when it receives the output $Q_6$ of the flip-flop 6. Each cycle of the signals $\overline{Q_6}$, $Q_7$ and $Q_8$ is six times as long as the cycle of the output pulse $\alpha$ of the pulse generator A and 12 times as long as the cycle of the signals $Q_9$ and $\overline{Q_9}$.

The signals $d_1$, $d_2$ and $d_3$ are produced from the pulse groups $C_1$, $C_2$ and $C_3$ and the outputs $Q_6$, $Q_7$ and $Q_8$ of the ring counter. First of all, the signal $C_2$ and output $Q_7$ are put into the NAND circuit 16 to obtain the output $d_1$. The signal $C_2$ and output $Q_8$ are put into the NAND circuit 15 to obtain the output $d_2$. The signal $C_3$ and outputs $Q_7$ and $Q_8$ are put into the NAND circuit 17 to obtain the output $d_3$. When these outputs $c_1$, $d_1$, $d_2$ and $d_3$ are put into the NAND circuit 18, the output $f$ will be obtained.

Figure 1B:
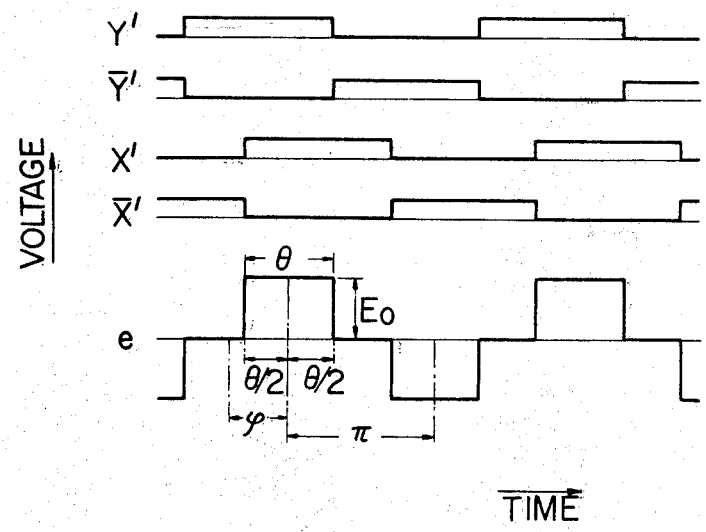
FIG. 1B shows control signals and output voltages employed in the device of FIG. 1A.
Figure 2:
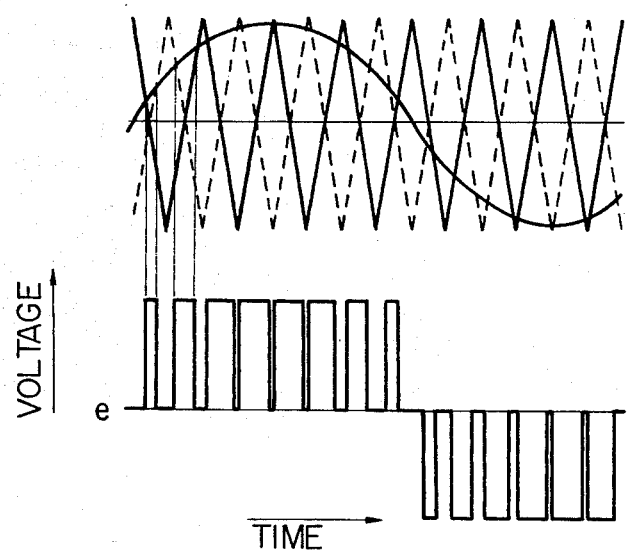
FIG. 2 is of an example for explaining the operation of a conventional inverter controlling method.

When the signals $f$ and $Q_9$ are put into the NAND circuit 19, the output $h$ will be obtained. Further, the signal $f$ as put into the NOT circuit 22 to invert the logic signal and the signal $Q_9$ are put into the NAND circuit 20 to obtain the signal $g$. When the signals $g$ and $h$ are put into the NAND circuit 21, the signal $Y'$ will be obtained. When the signal $Y'$ is put into the NOT circuit 23, the signal $\overline{Y}'$ will be obtained. The inverter in FIG. 1 is driven with these signals $X'$, $\overline{X}'$, $Y'$ and $\overline{Y}'$.

The pulses of the alternating current voltage "$e$" (FIG. 3) obtained by driving the inverter with these signals $X'$, $\overline{X}'$, $Y'$ and $\overline{Y}'$ correspond respectively to the signals $C_1$, $C_2$ and $C_3$. Therefore, there pulse widths and cycles are equal respectively to the pulse widths and cycles of the signals $C_1$, $C_2$ and $C_3$. For example, the width $\theta_1$ of the first pulse of the voltage "$e$" is equal to the pulse width of the signal pulse $C_1$. In the same manner, the widths $\theta_2$ and $\theta_3$ of the second and third pulses are equal respectively to the widths of signal pulses $C_2$ and $C_3$. The cycle of the pulse is $\pi/6$ (the cycle of the signals Y and Y' is $\pi$ which is a half cycle of the operation of the inverter, and this cycle is six times as long as of the output pulse $\alpha$ of the pulse generator A) and is all equal.

As the pulses forming this voltage "$e$" are constant in the cycle, and the ratio of the pulse widths approximately satisfies the formula (4), the higher harmonics of lower ordinals (3rd, 5th and 7th) can be well inhibited.

In order to vary the frequency of this voltage "$e$", the cycle of the pulse $\alpha$ of the pulse generator A is varied and, in order to vary the voltage level, the cycle of the pulse $\beta_1$ of the pulse generator B is varied. At a constant voltage and constant frequency, the pulse $\alpha$ can be obtained also by dividing the pulse $\beta_1$.

An example in which 6 pulses are contained in the output voltage "$e$" of the inverter has been explained in the above. However, it is to be noted here that, even if the number of pulses is increased to be more than 8 pulses, the condition of the formula (8) will be able to be approximately satisfied by increasing the number of the flip-flops of the ring counter. Further, even if the ring counter is not used as in this embodiment, the pulse groups $C_1$, $C_2$ and $C_3$ will be able to be obtained by the combination of the logic sum and/or logic product of the outputs of such counting circuit of a general IC as, for example, a shift register of IC.

Figure 14:
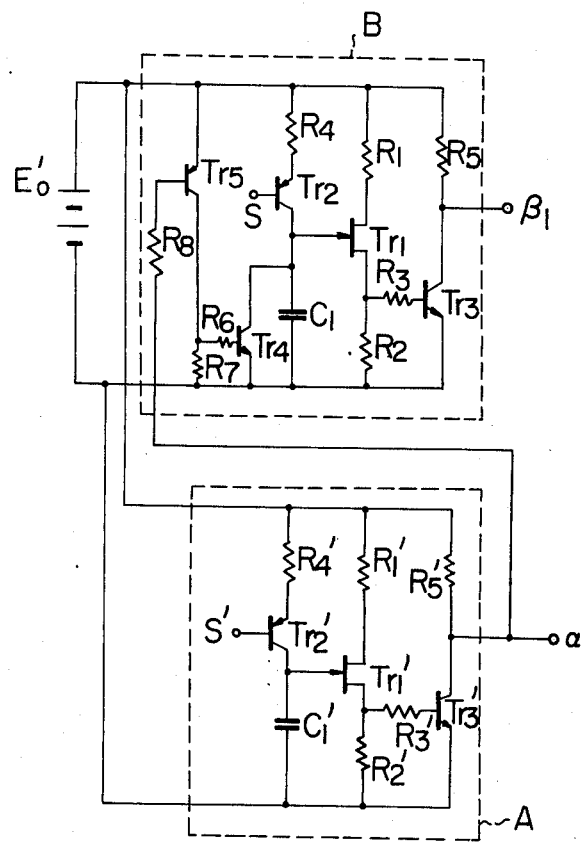
FIG. 14 shows an example of practical circuits of pulse generator employed in the present invention.

FIG. 14 is of an embodiment of the pulse generators A and B, wherein $Tr_1$ and $Tr_1'$ are unijunction transistors, $Tr_2$ to $Tr_5$, $Tr_2'$ and $Tr_5'$ are transistors, $R_1$ to $R_8$ and $R_1'$ to $R_5'$ are resistances, and $C_1$ and $C_1'$ are condensers.

A high frequency relaxation oscillator is formed with the transistors $Tr_1$ and $Tr_2$, resistances $R_1$ and $R_4$ and condenser $C_1$ and a low frequency relaxation oscillator is formed with the transistors $Tr_1'$ and $Tr_2'$, resistances $R_1'$ and $R_4'$ and condenser $C_1'$. Each of the circuits formed respectively with the transistor $Tr_3$ and resistances $R_3$ and $R_5$ and with the transistor $Tr_3'$ and resistances $R_3'$ and $R_5'$ is an amplifying NOT circuits. Transistors $Tr_4$ and $Tr_5$ and resistances $R_6$ and $R_8$ are forming a resetting circuit. E' is a direct current source. The operation of the pulse generator B shall be explained. The transistor $Tr_2$ causes a current determined by the base voltage S to flow through the resistance $R_4$ to charge the condenser $C_1$. When the voltage of the condenser $C_1$ is thereby elevated to reach a fixed level determined by the unijunction transistor $Tr_1$ and resistances $R_1$ and $R_2$, the electric charge of the condenser $C_4$ will be discharged through the unijunction transistor $Tr_1$ and resistance $R_2$. Then a pulse voltage will be generated in the resistance $R_2$. When the discharge of the condenser $C_1$ advances until the current reduces, the unijunction transistor $Tr_1$ will be in OFF and the condenser $C_1$ will be again charged. By such cyclic charge and discharge of the condenser $C_1$, pulses will be generated in the resistance $R_2$. The cycle of pulses is made by varying the base signal S, that is, by varying the magnitude of the charging current of the condenser $C_1$.

The pulse voltage across the resistance $R_2$ is applied to the transistor $Tr_3$ through the resistance $R_3$. The transistor $Tr_3$ is normally in OFF and, therefore, will be OFF only while the output $\beta_1$ is on the level of the current source voltage E' and a pulse voltage is being generated in the resistance $R_2$. The output $\beta_1$ will be on the "0" level only while the transistor $Tr_3$ is ON.

The pulse generator A also operates in the same manner. However, the signal S' is different from the base signal S, the charging current of the condenser $C_1'$ is kept small and, therefore, the cycle of the relaxation oscillation is made longer than that of the pulse generator B.

When the pulse $\beta$ is generated, the transistor $Tr_5$ will be ON to generate pulses in the resistance $R_7$. Further, when a pulse voltage is generated in the resistance $R_7$, the transistor $Tr_4$ will receive a base current through the resistance $R_6$ and will be ON to discharge the charge of the condenser $C_1$. Therefore, whenever the pulse $\beta$ is generated, the condenser $C_1$ will discharge the current once to the "0" level. That is, the operation of the pulse generator B is periodically reset by the pulse generator A.

As explained above, according to the present invention, there can be obtained a pulse train having a fixed ratio of widths at fixed phase intervals in a half cycle of the basic wave output voltage of an inverter and, therefore, when the inverter is driven by using it, the higher harmonic components of lower ordinals contained in the output voltage of the inverter will be able to be inhibited and the frequency and voltage of the basic wave output voltage will be able to be respectively independently and easily adjusted.

What is claimed is:

1. An inverter controlling device comprising a direct current source, a bridge inverter connected to said direct current source and having a plurality of switching elements in bridge arms for converting a direct current from said source to an alternating current, and a controlling means for operating said switching elements in a predetermined sequence,
   said controlling means being adapted to divide each half cycle of a basic wave voltage into an even number of sections respectively having an equal phase interval and produce a pulse voltage at the center of each of said sections,
   to render the width of said pulse voltages in each half cycle to be wider sequentially as they approach the center of the cycle than that of the pulse voltages at both ends of the cycle with a predetermined ratio, and
   to produce as inverter output a plurality of similar pulse voltages to a pulse train consisting of said pulse voltages.

2. The device according to claim 1 wherein said controlling means comprises means for producing a first group of pulse signals each having a pulse width equal to a half cycle of said alternating current, means for producing a second group of pulse signals each having a pulse width equal to each of a plurality of divided sections of said half cycle, means for producing a third group of pulse signals each having a pulse width equal to each of an even number of divided sections of said half cycle, means for producing a fourth group of pulse signals having a predetermined pulse width ratio with respect to said even number of divided sections of said third pulse signals, means for obtaining pulse trains from a combination of at least one of logic sum and logic product of said first to fourth pulse signals, and means for producing as inverter output a plurality of pulse voltages from said pulse trains.

3. The device according to claim 1 wherein said controlling means comprises a first pulse generator producing a first group of pulse signals responsive to the frequency of said alternating current voltage, a second pulse generator producing a second group of pulse signals having a higher frequency than said first pulse signals, means for obtaining a plurality of third signals responsive to said first pulse signals and different in delay time, means for obtaining a plurality of fourth signals respectively having a different width from combinations of different ones in said third signals, and means for obtaining said pulse train from said fourth signals responsive to the first signals.

4. The device according to claim 1 wherein said controlling means comprises a first pulse generator periodically generating first pulse signals, responsive to said alternating current voltage, a second pulse generator generating second pulse signals higher in the frequency than said first pulse signals, a first counting means dividing the frequency of said first pulse signals, a second counting means reset by said first pulse signals and thereafter dividing the frequency of said second pulse signals, a pulse forming means producing third pulse signals from an output of said second counting means, and means for logically operating said third signals and an output of said first counting means to generate a pulse train consisting of an even number of pulses in which the distance between the centers of the pulses are equal to each other in a half cycle of an output of said first counting means, pulse widths of said pulse train being symmetrical to the center of said half cycle and the pulses nearer to the center being larger in the width than the pulses at both ends.

5. The device according to claim 1 wherein said controlling means comprises a first pulse generator periodically generating first pulse signals responsive to said alternating current voltage, a second pulse generator generating second pulse signals higher in the frequency than said first pulse signals, a first counting means dividing the frequency of said first pulse signals, a second counting means reset by said first pulse signals and thereafter dividing the frequency of said second pulse signals, means for logically operating outputs of said first and second counting means, and a pulse forming means to which said logically operated outputs are provided to produce third pulse signals, said logical operating means being adapted to further logically operate said third pulse signals and generate a pulse train consisting of an even number of pulses in each half cycle of the output of said first counting means with equal distances between the respective centers and with symmetrically varying pulse widths with respect to the center of said half cycle so that the widths of the pulses nearer said center will be larger than those of both ends.

6. The device according to claim 1 wherein said pulse train consists of $2n$ pulses arranged so that the distance between the centers of the pulses will be $\pi/2n$ and, when the pulse width at both ends of the half cycle is $\theta_1$, the pulse widths approaching the center of the half cycle from $\theta_1$ are respectively $\theta_2, \theta_3, \ldots$ and the pulse width of the pulses at both ends of the center of the half cycle is $\theta_n$, approximately the relation of $$\theta_1 : \theta_2 : \ldots : \theta_i : \ldots : \theta_n = \sin\frac{\pi}{4n} : \sin\frac{3\pi}{4n} : \ldots : \sin\frac{(2i-1)\pi}{4n} : \ldots : \sin\frac{(2n-1)\pi}{4n}$$

will be satisfied.

7. The device according to claim 3 wherein in case the pulses in said pulse train in the half cycle are 6, a relation between pulse widths $\theta_1 (=\theta_6)$, $\theta_2 (=\theta_5)$ and $\theta_3 (=\theta_4)$ as follows $$\theta_1 : \theta_2 : \theta_3 = 0.25 : 0.75 : 1$$

will be satisfied.

8. The device according ot claim 1 wherein said control means comprises a first pulse generator, a ring counter dividing an output $\alpha$ of said first pulse generator, a first flip-flop receiving an output $a_1$ of said ring counter as an input and providing outputs X' and $\overline{X}'$, a second pulse generator, a counting circuit receiving an output $\beta$ of said second pulse generator as an input and reset by said output $\alpha$, a plurality of flip-flops receiving an output of said counting circuit as an input, a plurality of OR gates receiving the output of said ring counter as an input, a plurality of AND gates receiving one of outputs of said plurality flip-flops and one of outputs of said OR gates as a pair of inputs, a first OR gate receiving all the outputs of said AND gates as inputs, a first AND gate receiving outputs of said first OR gate and flip-flop as inputs, a second AND gate receiving the output of said first OR gate through a NOT circuit and the output $\overline{X}'$ of said ring counter as inputs, a second OR gate receiving outputs of said first and second AND gates as inputs and providing an output Y', and a NOT gate receiving the output Y' of said second OR gate as an input and providing an output $\overline{Y}'$.

9. The device according to claim 7 wherein said second pulse generator is of a variable frequency and is adapted to vary its output voltage frequency by varying frequency of the generator.

10. The device according to claim 7 wherein the output voltage is varied by varying the pulse width of the pulse train controlling said switching element.

11. The device according to claim 1 wherein said control means comprises a first pulse generator, a second pulse generator reset by an output $\alpha$ of said first pulse generator, a first NAND gate receiving an output $\beta_1$ of said second pulse generator as an input, a second NAND gate receiving an output $\beta_2$ of said first NAND gate and the output $\alpha$ of said first pulse generator as inputs, a first ring counter comprising a plurality of flip-flops and receiving the output $\beta_2$ of said second NAND gate as a clock input and the output $\alpha$ of said first pulse generator as a clear input, a second ring counter comprising a plurality of flip-flops receiving the output $\alpha$ of said first pulse generator as a clock input and provided with clear terminals, a single flip-flop receiving an output $\overline{Q}_6$ of said second ring counter as a clock input and providing outputs X' and $\overline{X}'$, a third NAND gate receiving outputs $Q_1$ and $Q_4$ of said first ring counter, a fourth NAND gate receiving outputs $\overline{Q}_2$ and $\overline{Q}_3$ of said first ring counter as inputs, a fifth NAND gate receiving an output of said fourth NAND gate and an output $Q_8$ of said second ring counter as inputs, a sixth NAND gate receiving the output of said fourth NAND gate and an output $Q_7$ of said second ring counter as inputs, a seventh NAND gate receiving outputs $\overline{Q}_1$ and $\overline{Q}_4$ of said first ring counter as inputs, an eighth NAND gate receiving an output of said seventh NAND gate and the outputs $Q_7$ and $Q_8$ of said second ring counter as inputs, a nineth NAND gate receiving outputs of said third, fifth, sixth and seventh NAND gates as inputs, a tenth NAND gate receiving an output of said nineth NAND gate and the output $\overline{X}'$ of said single flip-flop as inputs, an eleventh NAND gate receiving an output of said nineth NAND gate as an input through a NOT circuit and receiving the output X' of the single flip-flop as another input, a twelfth NAND gate receiving outputs of said tenth and eleventh NAND gates as inputs and providing an output Y' and a NOT gate receiving said output Y' as an input and providing an output $\overline{Y}'$.

* * * * *